United States Patent [19]

MacFarlane

[11] Patent Number: 4,777,425

[45] Date of Patent: Oct. 11, 1988

[54] ALTERNATOR VOLTAGE REGULATOR WITH SPEED RESPONSIVE CONTROL

[75] Inventor: Alistair A. MacFarlane, East Kilbride, Scotland

[73] Assignee: Marathon Electric Manufacturing Corp., Wausau, Wis.

[21] Appl. No.: 697,058

[22] Filed: Aug. 15, 1986

[51] Int. Cl.$^4$ .............................................. H02P 9/00
[52] U.S. Cl. ...................................... 322/28; 322/25; 322/27; 322/32; 322/73; 320/64
[58] Field of Search ....................... 322/25, 27, 28, 59, 322/73, 32; 320/64

[56] References Cited

U.S. PATENT DOCUMENTS

| | | | |
|---|---|---|---|
| 4,219,769 | 8/1980 | MacFarlane et al. | 322/28 |
| 4,245,183 | 1/1981 | Glennon | 322/28 |
| 4,368,417 | 1/1983 | Matsuyama | 320/64 X |
| 4,629,968 | 12/1986 | Butts et al. | 320/64 X |
| 4,651,081 | 3/1987 | Nishimura et al. | 320/64 |

Primary Examiner—Patrick R. Salce
Assistant Examiner—Anita M. Ault
Attorney, Agent, or Firm—Andrus, Sceales, Starke & Sawall

[57] ABSTRACT

A voltage regulator for a diesel engine driven alternator includes speed dip control permitting engine recovery, and a voltage signal circuit and a speed signal circuit producing a linear volts per hertz signal for controlling the RMS voltage of the alternator. A speed sensor is connected to the output of the permanent magnet generator. The signal is a filtered square wave with an accurate 50% mark-to-space ratio and converted to a pulse train coincident with the zero crossovers. A ramp circuit followed by a threshold detector and filter produces a linearly increasing voltage with decreasing speed. A level amplifier produces an output at a selected level. A rate amplifier responds to a derivative of the speed signal and clamps the level amplifier off at speed changes below a selected rate. A large and rapid speed change creates an output signal coupled to the reference side of an error amplifier to unload the alternator. The degree and rate of unloading is limited. The linear speed signal is summed with a linear RMS voltage error signal to produce a highly linear volts per hertz signal. The root mean square voltage signal is derived from the mean square of the sensed output voltage. The square root circuit is a pulse-height-width multiplier connected in a negative feedback loop to an operational amplifier to produce an implicit divider circuit. The non-inverting input is connected to the mean square signal and the amplifier forces the squared output signal equal to such mean square value, such that the output is in fact the square of the mean value.

24 Claims, 2 Drawing Sheets

ALTERNATOR VOLTAGE REGULATOR WITH SPEED RESPONSIVE CONTROL

BACKGROUND OF THE PRESENT INVENTION

This invention relates to an alternator voltage regulator with speed responsive control and particularly to such a regulator for an engine driven alternator.

A.C. power sources are used for various mobile and alternate power supplies. Engine driven alternators are required in various applications. The output of the alternator is regulated by a suitable electronic regulator to establish a given voltage at a given frequency. The engine driving the alternator may include a governor to establish a closed loop control of the engine speed. The regulated engine will establish the desired frequency and the electronic alternator regulator maintains the desired output voltage and current. The alternator regulators are designed to have a maximum speed of response and short time constant to changes in the output of the alternator. The alternator load effects the engine, and the effect may be significant, depending on the size of the load and the response time of the driving engine. Diesel engines, particularly such engines having a turbo-charging unit, have a relatively slow response or long-time constant in the regulator system, in comparison to that of the electronic regulators of the alternators. In the systems of the above response characteristic, a sudden increased load may result in a rapid speed drop in the engine and the driven alternator, with damaging results. In turbocharged diesel engines, the exhaust pressure runs the turbocharger. The turbocharger takes appreciable time to reach the operating speed. A sudden load application may be sufficient to create a speed drop at which the exhaust pressure decreases below that necessary to run the turbocharger up to operating speed. The result will be engine stall and complete loss of power. Similar results may occur with other engine driven system. Thus, naturally aspirated engines which are equipped with relatively slow governors may stall even with a regulator which includes a modifying fast acting "volts per hertz" ramp control to reduce the effect on the engine driving a load change which correspondingly reduces speed. For example, U.S. Pat. No. 4,219,769 which issued Aug. 26, 1980 to the present inventor and another, discloses a regulated system for alternators, with means to modify the electronic regulator for an alternator such that the alternator output voltage is reduced in a controlled manner as the frequency is reduced below a selected frequency. As a result, damage to the alternator is prevented. However, the system may not prevent engine stalling in engine driven systems wherein the rate of speed changes may be critical.

The above patent also discloses improvement in the operation of the voltage regulator by producing a response to the mean square of the alternator output which is assumed to provide the necessary constant. Alternators are rated and designed on the root mean square (R.M.S.) voltages, which is a true value of the heating effect of the alternator voltage and current.

The ratio of the RMS value of the voltage to the average value for sinusoidal waveshapes has a value of 1.11. For waves with pronounced peaks the ratio is higher and for flattened waves less than this value. In machines distortion normally gives a peak or chopped wave shape especially when load is applied and a regulator responding to the average will increase the ture RMS effect. A higher R.M.S. output may have a deleterious effect on loads such as lamps and the like. If a similar current measurement is used, an inadvertent overload may occur.

Generally, low speed operation may also result from operator misuse, an engine malfunction or fault, or running low on fuel over a protracted period and the like. Operation of the alternator under such conditions for other than short periods may result in burn-out of the alternator winding, damage to connected loads or regulator failure.

Further, certain applications may require a precise linear volts per hertz (V/Hz) error signal such that the voltage output decreases in proportion to a drop in the frequency output of the alternator. The conventional summing of the underspeed voltage signal with the sensed mean-squared voltage signal does not in fact produce the desired linear or essentially straight V/Hz curve or signal over more than a small frequency variation. For example, at 50% of rated speed, 50% of the D.C. sensing signal comes from the underspeed voltage signal and 50% from the mean square voltage signal. However, at such point, the sensed voltage is 71% of the full or rated speed voltage and when the ratio of the underspeed term is increased to give 50% of the voltage signal at the 50% speed point, the curve and output is non-linear at other points on the curve. Thus, the inventor has found that the actual R.M.S. voltage must be used and summed with linear underspeed voltage.

In summary, the prior art has not produced a satisfactory regulating system, particularly for engine driven alternator, to produce a proper modifying response to transiently or momentarily reduce the alternator load much faster than the normal V/Hz curve or characteristic so as to allow the loaded engine to recover before the load is increased to the full final value, or to produce the control with a precise V/Hz characteristic such as desirable in certain applications, for example, energizing a variable speed synchronous motor connected to drive pumps.

SUMMARY OF THE PRESENT INVENTION

The present invention is particularly directed to a regulator for an engine driven alternator having an overriding speed dip control permitting engine recovery, and more particularly a regulator having a linear speed signal below a selected operated frequency and means to sense the rate and level of a speed change for controlling the loading of the alternator. Generally, in accordance with this feature of the present invention, a speed related output signal such as the output of a permanent magnet generator driven with the alternator is processed to produce a frequency signal of a frequency proportional to alternator speed. The frequency signal is fed to a pair of circuits including a derivative term fed to a rate sensor and a level signal fed to a level monitor such as a level shifting amplifier to produce a response related to the rate of the speed change and to the level of the speed change. An offset or threshold control is introduced into each circuit such that only a selected large speed change operating at a sufficiently rapid rate is operable to cause a voltage reduction to a selected minimum level for a maximum period. In addition, the underspeed signal also causes a further reduction on the "volts per hertz" ramp or curve on top of the dip.

In a particular circuit, the speed sensor is connected to the output of the permanent magnet generator. A filter means removes extraneous components and a shaping circuit and a phase-locked loop unit locks the signal to the fundamental frequency and produces an accurate 50% mark-to-space ratio square wave (50% duty cycle square wave) to an edge detector which is connected to the loop unit and produces a narrow width pulse at each edge of the square wave. The pulse train from the edge detector is connected to a ramp circuit and comparator which produces a linearly increasing voltage with decreasing speed below a threshold level. The speed signal is converted to a related voltage signal and fed to a level switching amplifier which is responsive to produce a switching signal at a selected level. A derivative of the speed signal is coupled to clamp the level switch amplifier off at speed changes below a selected rate. The level of the speed change and the rate of speed change must therefore be of selected levels, at which point a proportional signal is coupled to the error amplifier to unload the alternator. Generally, the level of unloading is limited, and the rate of unloading is also limited to avoid transient dip in recovery. Thus, small speed dips have no effect while large, rapid dips will unload the alternator to allow recovery of the prime mover.

In accordance with a further feature of the invention, the linear speed signal is also fed to and combined with the voltage error signal which is a true root mean square signal. The result is an accurate and highly linear volts per hertz signal for normal control of the alternator.

The root mean square signal is derived by first generating the mean square value. The square root circuit is a pulse-height-width multiplier connected in a negative feedback loop to an operational amplifier to produce an implicit divider circuit. The non-inverting input is connected to the mean square signal and the amplifier forces the multiplier squared output signal to equal such mean square value, such that the output is in fact the square root of the mean square value.

The true root mean square signal is combined with the linear underspeed signal to produce an error signal which will maintain the output voltage constant at the rated frequency, and functions to reduce the true R.M.S. voltage signal with frequency reduction to correspondingly change the voltage level in a linear fashion.

The present invention thus provides an improved speed sensitive control to permit proper recovery of an engine driven alternator and the like and further an improved volts per hertz output control.

DESCRIPTION OF THE ILLUSTRATED EMBODIMENT

Figure 1:
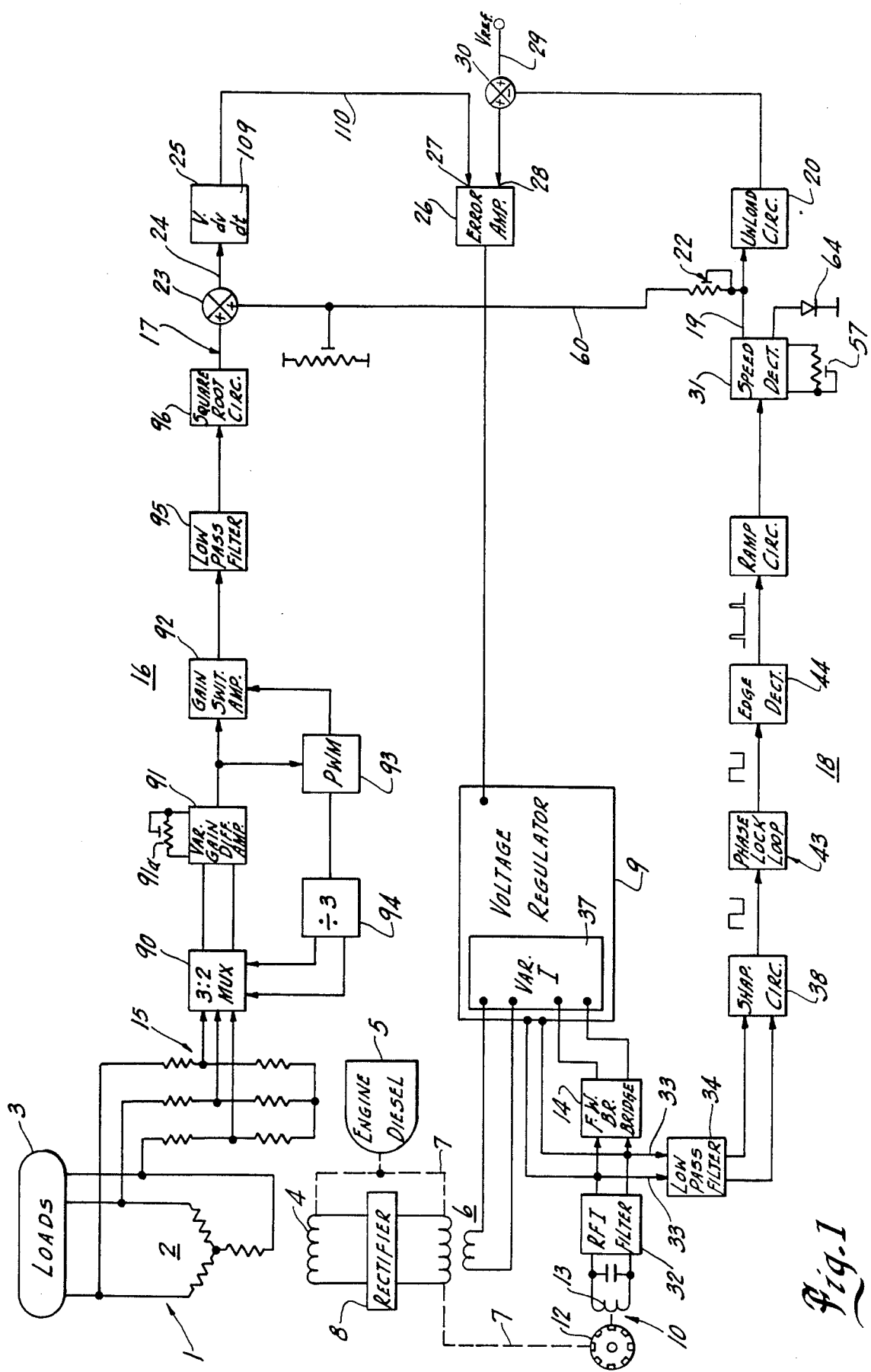
FIG. 1 is a block diagram of an alternator incorporating a speed limited regulator constructed in accordance with the teaching of the present invention.

Referring to the drawings and particularly to FIG. 1, an alternator 1 is illustrated having a three phase output winding 2 for providing three phase alternating current power to various loads 3. The invention is also equally applicable to single phase and other A.C. alternators. The output of the alternator 1 is controlled by the level of excitation of a rotating field 4 and by the speed of rotation of the field 4. The field is coupled to and driven by an internal combustion engine, a turbine or the like, and is diagrammatically shown coupled to a turbocharged diesel engine 5, as a typical illustration. The rotating field 4 is excited from the output of an exciter 6 which is connected to and rotated with the rotating field 4, as shown by line 7. The output of the exciter 6 is rectified by a full wave rectifier 8 and the level of excitation is controlled by a voltage regulator 9. The exciter 6 and the voltage regulator 9 are powered from a permanent magnet generator 10 having a rotor 12 also coupled to the turbocharged diesel engine 5, and also shown by line 7, and having an output winding 13 connected to the exciter 6 through the regulator 9. The rotor 12 may be a consequent pole rotor and produce an A.C. output supply. The output of the permanent magnet generator is also rectified as by rectifier 14 to provide a D.C. excitation current to the exciter 6. The output of the permanent generator also provides logic power to the voltage regulator 9. A voltage level sensing network 15 is coupled to the output of the alternator windings 2 and processed through a special circuit 16 to produce a signal at an output signal line 17 directly proportional to the root mean square of the output voltage of the alternator 1. In addition, the frequency output of the alternator 1 is monitored by a frequency sensor branch circuit 18 to develop a signal at an output line 19 directly related to the frequency below a selected threshold level. In the illustrated embodiment of the invention, the frequency sensing circuit 18 has an input connected to the output of the permanent magnet generator 10, the output frequency of which directly corresponds to the frequency of the alternator 1 and common drive 5. The output signal of the frequency sensing circuit 18 is a pulse train with a pulse width or duty cycle linearly related to the frequency. The output circuit is specially coupled to an unloading circuit 20 for effectively reducing the load on the alternator 1 in response to a large and rapid speed change which may be created by the actual load conditions. A change in the speed and frequency output of the alternator 1 is of course a direct indication of a corresponding change in the speed of engine 5. Reducing the load on the alternator 1 reduces the load on the engine, and permits recovery of the engine and return of the engine and the alternator to the desired speed. This control particularly prevents engine stall and undesired low speed operation of the system.

The speed related signal at line 19 is also coupled through a slope adjustment resistor 22 to a summing point 23 where the speed voltage signal at line 19 is combined with the RMS voltage signal at line 17 to generate a combined volts per hertz control signal at line 24. In the illustrated embodiment of the invention, the combined signal is applied to a differential circuit 25, the output of which is an applied to an input and summing error amplifier 26 of the voltage regulator.

In the illustrated embodiment of the invention, the linear voltage per hertz signal at unit 25 is connected to the input terminal 27 of error amplifier 26. The input 28 of the error amplifier 26 is connected to the unloading circuit 20. The output of circuit 20 is combined with a voltage reference signal line 29 to reduce the reference when unloading, as shown at summing point 30. Under normal conditions, the set reference signal at line 29 is transmitted to the error amplifier 26 and the output of the error amplifier is applied to the regulator 9 to vary the excitation of the exciter 6 and thereby alternator 1 to maintain the voltage at the desired RMS voltage for any given frequency. Thus, for example, in a typical application the alternator may provide a 480 volt output at a speed of 1,800 RPM and above. As the speed decreases below 1,800, a linear drop in the voltage with the speed is provided. The changeover speed may, of course, be readily controlled and set in any desired manner.

The circuit 18 monitors a change of speed and includes an underspeed detector unit 31 and an unloading circuit 20. Circuit 20 determines whether a transient speed change has been encountered. If a small transient condition is encountered, no correction is necessary and the system continues to monitor the change with the normal linear volts per hertz control. If the condition is other than a very momentary transient condition, the unit 20 further determines whether or not the speed change is of such an amplitude and rate of change as to require unloading of the alternator 1 and engine. If necessary, it so proceeds to unload If the change is not a transient, but is not of a sufficient amplitude or speed rate change to warrant unloading, the circuit 31 merely provides the linear frequency control signal to change the output voltage in accordance with a linear or straight line function.

The regulator 9 with the RMS voltage circuit 16 in combination with the dual function speed and frequency monitoring circuit 18 therefore provides a particularly improved means for maintaining the optimum operation of engine driven alternators and the like, with a true RMS control of the voltage, a highly linear volts per hertz control and the desired speed "dip" overriding control.

Figure 2:
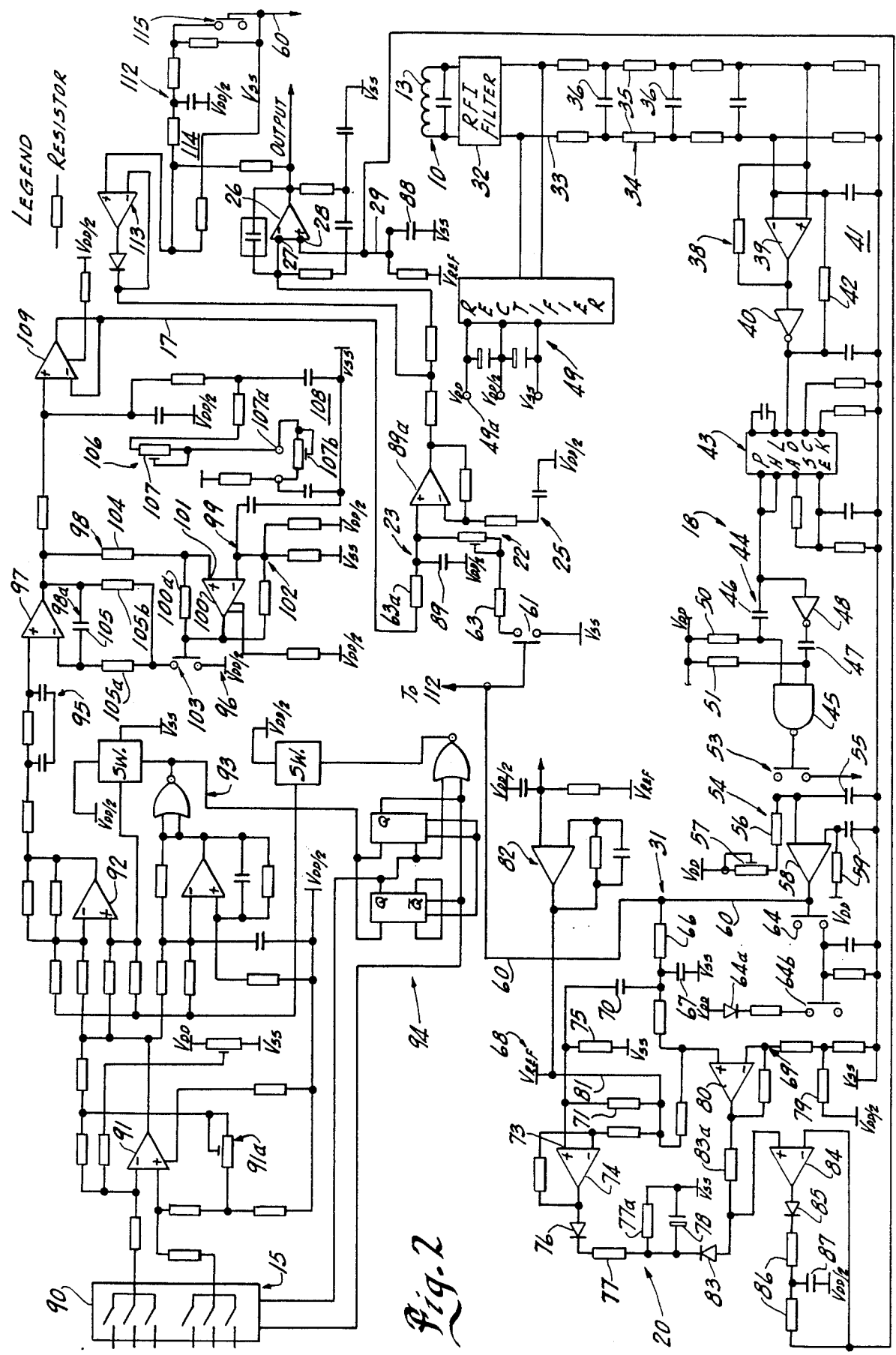
FIG. 2 is a schematic illustration of the circuit shown in FIG. 1.

A preferred embodiment of the invention is illustrated in FIG. 2.

Referring particularly to FIG. 2 and to the speed detection circuit, the input is connected to the output lines of winding 13 (FIG. 1) of the permanent magnet generator 10. A radio frequency interference (RFI) filter 32 is connected across the output lines, and the frequency signal lines 33 are connected to the filtered A.C. signal. A ladder filter 34 is connected to the frequency signal lines 33 to provide an improved wave shape within circuit 18. Thus, the regulator may use a field effect transistor or other such device in series with the output of the permanent magnet generator 10 and the exciter field control unit 37 (FIG. 1) for controlling the excitation of the exciter 6 and alternator 1. The ladder filter 34 consists of a plurality of interconnecting series resistors 35 and paralleled capacitors 36 to the supply line in accordance with the well known construction. The switching signals and the like may be reflected in the wave shape and the ladder filter 34 improves the wave shape signal to the sensor to truly reflect the frequency related signals.

The output of the ladder filter 34 is fed to a shaping circuit 38, shown as a schmitt trigger circuit including an operational differential comparator 39 connected to the ladder filter and an output inverter 40 with an appropriate resistor feedback 42. Further positive feedback to the differential is amplifier established through resistor 41 to produce balance hysteresis. The output of the Schmitt trigger circuit is a square wave signal. The output of the shaping circuit 38 is coupled to a phase-locked loop integrated circuit 43. Circuit 43 establishes a square wave signal with an accurate 50% mark to space ratio directly related to the fundamental frequency of the permanent magnet generator and the alternator. The phase-locked loop circuit 43 is particularly necessary with the permanent magnet generator 10 wound with a consequent pole construction. Thus, such a permanent magnet generator 10, particularly under low speed conditions, may include rather severe harmonic content. If such harmonic content is not removed, unpredictable triggering control may result by the processing of the square wave signal on the subsequent circuits, as presently described.

The phase-locked loop circuit 43 is illustrated as a standard circuit unit. An edge detector and frequency doubler circuit 44 is connected to the output of the phase-locked loop unit 43. The frequency doubler includes a NAND gate 45 having one input connected to the phase-locked loop circuit through a capacitor 46 and the second input connected to the same output of the phase-locked loop unit by a capacitor 47 and an inverter circuit 48. The NAND inputs and the capacitors 46-47 are also connected to the logic voltage supply, shown at 49a, in series with similar resistors 50-51. The logic voltage supply in the illustrated embodiment of the invention is derived from a rectified output of permanent magnet generator, or other power supply source. The rectified output is coupled through an appropriate network 49 to generate three logic voltages, shown generally with the voltage notation of a $V_{SS}$ as a basic ground or zero rail reference level line, a $V_{DD}$ (49a) as a maximum positive voltage level line with respect to such zero rail line and a center voltage line equal to $V_{DD}/2$. In the illustrated circuit of FIG. 2, for example, the speed sensing circuit has a common connection to the zero rail line, whereas the voltage sensor circuit is connected to the center line as a common. The particular interconnections will of course be dictated by the specific component and circuit connections used and such supply systems will be readily recognized and provided by those in the art. Therefore, the particulars of the voltage logic supply are not features of the present invention other than as necessary in any logic and control system, and the many particular connections are not specifically numbered and described for purposes of clarity and simplicity of description.

The output of the NAND gate 45 is a positive output pulse on each edge of the square wave signal from the phase-locked loop unit 43. The pulse width is set by the differentiator resistor 51 and capacitor 47 on a positive-going pulse and by the similar resistor 50 and capacitor 46 on a negative-going pulse square wave edge. The pulse output signals are high narrow pulses and are approximately equal in value. Each pulse is nearly coincident with a zero crossing point of the supply wave form and at a corresponding double frequency.

A switch 53, shown diagrammatically as an integrated circuit, has an input connected to the output of the pulse circuit 44. The switch 53 is connected to control a ramp charging circuit 54. In particular, a capacitor 55 is connected in series with a resistor 56 and an adjustable potentiometer 57 to the logic voltage supply. The potentiometer 57 sets the operating or underspeed threshold point of the circuit as presently developed. The integrated switch 53 is connected in parallel with the capacitor 55. When the switch 53 closes, the capacitor 55 rapidly discharges to the zero voltage rail. When the switch 53 opens, the capacitor recharges toward the positive voltage rail with a time constant set by the fixed resistor 56 and the underspeed potentiometer 57. At a selected threshold and greater frequencies, the capacitor 55 is charged and discharged at a rate to prevent the capacitor voltage from rising above a selected triggering level. However, as the frequency decreases, the frequency of the switch 53 closing is reduced, which permits the capacitor 55 to recharge to a higher level. At some frequency set by the setting of the underspeed potentiometer 57, the capacitor 55 charges to a threshold level, generally selected to be the maximum supply level divided by two.

The voltage of the capacitor 55 is connected to the non-inverting input of a difference operational amplifier 58. The inverting input is connected through an RC network 54 to the threshold voltage 52. The amplifier 58 switches to establish a positive output when capacitor 55 reaches the threshold voltage level. The output voltage has a pulse width which is proportional to the capacitor 55 is charged to the threshold level, and will provide a ratio inversely proportional to the frequency. Thus at half speed, the signal will be 50%. At 25% speed, the signal will be 75% and so forth. The output voltage pulses at the output line 60 are connected to the unloading circuit 20 and via an integrated switch 61, a variable slope control resistor $22^4$ and a fixed resistor 63 to the RMS voltage signal at summing point 23 previously noted with respect to FIG. 1, and described with respect to FIG. 2 as follows.

The output of the amplifier 58 is also shown coupled directly through an integrated switch 64 circuit to drive an LED lamp 64a indicating the underspeed operating condition. The lamp 64a is shown as an LED connected to the supply in series with an analogue switch 65 which is coupled to the output of analogue switch 64 and a pulse switching circuit 64a. Lamp 64a is thereby correspondingly operated in response to the voltage pulse below the threshold set by the underspeed potentiometer.

The unloading circuit 20 includes a smoothing circuit consisting of a series resistor 66 and a capacitor 67 to the zero rail supply voltage. Circuit 20 produces a linearly increasing voltage with decreasing speed at and below the threshold set by the underspeed potentiometer 57.

The unloading circuit 20 includes the rate sensing circuit 68 for determining the rate of change of the speed signal from the underspeed detector 31 and the level sensing circuit 69 for sensing the level of the voltage, and therefore the amplitude or amount of the speed change.

The rate and level sensing circuits 68 and 69 are combined to conjointly control the unloading circuit 20 such that the unloading system will not respond to a small speed dip or one occurring over a long period of time. However, a large and fast speed change or dip will result in the conjoint response of the rate sensing circuit 68 and the level sensing circuit 69 to produce an output control signal which is shown connected to rapidly unload the alternator 1 by appropriate reducing of the reference signal input 28 of the error amplifier 26.

The rate sensing circuit 68 includes a derivative capacitor 70 and resistor 71. The junction 72 of the capacitor 70 and resistor 71 is connected to the positive input terminal 73 of a non-inverting amplifier 74. The positive terminal is also connected to the rail supply through an offset resistor 75 to prevent switching of the amplifier 74 in response to small speed changes. A rapid speed change, however, drives the output of the operational amplifier 74 positive by an amount proportional to the rate of change in the underspeed signal. The output of the operational amplifier is coupled through a diode 76 and a resistor network 77 to charge a capacitor 78 through the connection to the zero voltage rail. This develops a voltage signal across the capacitor 78 which is connected to control the output level sensing circuit 69, as follows.

The voltage signal from the RC circuit 66 and 67, which is essentially inversely proportional to the generator speed below the threshold set by 57, is applied through a resistor 79 to the positive input of a level shifting differential amplifier 80.

The ground referenced D.C. voltage on the capacitor 67 is shifted to a positive going D.C. voltage referenced to the system reference voltage through the connection to the reference voltage line 81. The system reference line 81 is connected to an effective reference voltage derived from the stabilized supply rails through a voltage buffer amplifier 82 for biasing of the amplifiers 74 and 80.

Resistor 79 introduces a small offset in the signal to the amplifier 80 which prevents the operation of the circuit until the voltage signal is increased to a few hertz below the threshold setting of the underspeed setting potentiometer.

The amplifier 80 for a large speed change transmits an output signal. The output of amplifier 80 is normally bypassed to the rate sensing circuit via a diode 83, resistor 77a and resistor 83a. When capacitor 78 is charged by the rate sensing circuit however, it reverse biased the diode 83. When the diode 83 is reversed bias, the proportional signal from the level switching differential amplifier 84a via resistor 83a is impressed on a buffer amplifier 84. The output of the buffer amplifier 84 is coupled by a series diode 85 and a resistor network 86 to the positive or reference input line 92 of the error amplifier 26 which is the reference side of the error amplifier. The resistance network 86 is selected to limit the reduction in the reference voltage to a selected percentage of the system specification to limit the degree of unloading. Thus, for example, in a practical application, the reduction in the reference voltage was approximately 27% which resulted in a reduction of about 50% KVA unloading. A capacitor 87 is connected to the output of the buffer amplifier and to maximum supply voltage divided by two and a similar capacitor 88 connects the reference line 29 to the same supply voltage. The capacitors 87 and 88 limit the rate of the unloading action to further prevent creation of an additional transient dip in recovery and to maintain system operation within design specification.

The result of the illustrated unloading circuit is therefore to essentially eliminate response to transient speed changes and small speed dips. A large and fast speed or dip change, however, results in a reduction in the reference voltage proportional to the amount of the speed change and lasting for a time proportional to the amount and speed of the speed dip. A very large dip will result in a reduction to the minimum specified value and for a maximum time period, for example, 5 to 10 seconds. This insures the optimum operation of an engine driven alternator 1 permitting the necessary recovery of the engine 5 with sudden changes in loads 3, while otherwise permitting the normal voltage regulation of the alternator.

As previously noted, the highly linear speed change signal transmitted by line 60 is combined with the RMS signal at line 17 in the summing point 23 to provide a truly linear R.M.S. volts per hertz control signal for regulating the output voltage of the alternator output.

The output pulse train generated by the capacitor 55 charging and discharging network produces a pulse train signal directly related to the level of speed change of the alternator system. The pulse train signal is coupled to the integrated switch 61 via line 60. The switch 61 connects zero voltage supply to the summing point in series with the slope adjusting potentiometer or resistor 22 and fixed resistor 63 and develops a pulse width modulated signal to the summing point. The pulse train signal is filtered by the filter capacitor 89 in series with the fixed resistor 63 to produce a proportional D.C. signal which is summed with the voltage monitoring signal for producing the linear volts per hertz signal, which is impressed on a differentiating amplifier 889a. The system responds to a change by differentiating the signal and applying such differentiated signal summed with the original signal from amplifier 89a to the high gain error amplifier 26. In the presence of a step change, a pulse signal is applied to the error amplifier 26 to correspondingly drive the amplifier in accordance with the volts per hertz control function, which is an essentially linear or straight line function, the precise slope of which is controlled by the potentiometer 22. The signal from the voltage circuit 16 in the steady state is a D.C. voltage signal linearly related to the RMS voltage output of the alternator 1.

In the present invention, the voltage sensing network of circuit 16 gives a true R.M.S. control signal at the line 17 and to summing point 23, as follows.

The circuit 16 generates a mean square signal generally in accordance with the teaching of applicant's previously identified U.S. Pat. No. 4,219,769. With reference to FIGS. 1 and 2, the voltage output of the alternator 1 is sensed by voltage sensing network 15, shown as a voltage dividing network in FIG. 1 for sensing each phase voltage of the polyphase alternator output voltage. The output of the voltage sensing network 15 is connected to a multiplexer 90 to sequentially sense each of the phase voltages at a selected rate. The output of the multiplexer 90 is connected in the illustrated embodiment of the invention to a variable gain differential amplifier 91 to provide a signal corresponding to the phase voltages.

The amplifier 91 includes a coarse voltage adjustment potentiometer 91a controlling the gain of the amplifier and the normal upper voltage limit within which normal regulation is established. The output of the amplifier 91 is applied to a gain switched amplifier 92 and to a pulse width modulator 93. The pulse width modulator is also connected to the gain switched amplifier 92, such that the output of the gain switched amplifier 92 is the mathematical square of the input voltage. The output of the pulse width modulator is also connected to a divide-by-three circuit 94 to operate the multiplexer for sequential and continuous sampling of the three phase voltages from the alternator. The output of the pulse width oscillator drives a suitable counter 94, the output of which in turn is coupled to drive the multiplexer 15 and establish the desired sequencing of the circuit.

The squared voltage signal of the gain switched amplifier 92 is connected to a low pass filter 95, shown as an R-C network FIG. 2, which generates a mean square signal, as fully developed in the cross-referenced application. Generally, the gain switched amplifier 92, as more fully disclosed in the previous application, includes an amplifier state which has a gain switched between a positive and negative sign of equal amount. The pulse width modulator is a free-running square wave generator having a capacitor which is charged and discharged. The resulting output from the gain switched amplifier 92 is a pulse train of amplitude proportional to the second voltage and a time ratio proportional to the sensed voltage. The filter circuit 95 averages the pulse train, and thereby generates a means square value of the sensed voltage.

In accordance with the teaching of the present invention, the output of the mean square circuit 95 is coupled to a square root circuit 96 which develops an output signal proportional to the square root of the means square voltage signal appearing at the output of the low pass filter 95.

The illustrated square root circuit 96 includes an operational amplifier 97 with a negative feedback circuit 98. A pulse width modulator 99 is also connected to the output of the amplifier 97. The pulse width modulator 99 in conjunction with switch 103 comprises a multiplier and includes an operational amplifier 100 with the non-inverting input 101 connected to a threshold voltage and a feedback circuit 102 such that as the output value of the amplifier 97 increases, (negative of center voltage) the output of the pulse width modulator 99 causes the output mark to space ratio to decrease. The output of the pulse width modulator 99 is coupled to an integrated analog switch 103, shown diagrammatically. The switch 103 is connected to the negative feedback circuit 98 of the amplifier 97 and is effective to change the feedback signal. Thus, the network 98a includes a feedback resistor 105b which is connected to the center voltage for the time period that the output of the pulse width modulator amplifier is high. The feedback network 98 also includes an integrator consisting of a feedback capacitor 105 connected between the output of the operational amplifier and the inverting input and a resistor 105a connected between the inverting input and the center voltage connecting switch. The voltage at the negative feedback connection is proportional to the output voltage of the operational amplifier and its average value is proportional to the output voltage square.

Generally, the illustrated pulse width modulator 99 is a well known circuit consisting of a conventional operational amplifier oscillator 100 with a positive feedback loop connected to the non-inverting input via the resistor 100. The signal at the non-inverting input 101 is compared with the capacitor charge and discharge cycle on the inverting input.

In summary, the operational amplifier 97 with the pulse width-height type multiplier 96 connected in the negative feedback loop about the operational amplifier 97 produces an implicit divider circuit in which the output of the operational amplifier 97 is multiplied by itself to produce a squared signal from the multiplier. This squared signal is thus applied to the negative or inverting input. The mean square signal is derived from the preceding network and is connected to the non-inverting input. The operational amplifier 97 will force the multiplied voltage to be equal to such squared and multiplied voltage squares such that the output voltage at the line 17 is necessarily the square root of the mean square voltage.

The illustrated circuit provides a simple, reliable and readily constructed square root generating circuit. Although monolithic integrated multipliers and other forms of root means square generating circuits are available, such devices generally are unacceptably costly and generally have unacceptable high temperature drift characteristics, and may further require that the three phases be separately sensed to generate the three phase signals to the input of such square root generating circuits. The present invention provides a reliable and highly effective square root generating circuit signal without the attendant difficulties and expense of other alternatives, which of course might be employed within the broadest concepts of the present invention.

The RMS output signal from amplifier 97 is impressed on a resistive divider network 106 including a fine tuning potentiometer 107. A set of terminals 107a provides for connection of a remote potentiometer 107b, and are connected by a jumper wire when the remote unit is not used. A system gain control unit circuit 108 is connected to output side of network 106. The fine tuning circuit 106 permits further adjustment within the course setting established by the potentiometer 91a at the input differential variable gain amplifier 91. The fine tuned RMS signal is fed through a buffer amplifier 109 to summing point 23, at which the signal is combined or summed with the constant volts per hertz signal, which includes the slope adjustment potentiometer 22.

The output of the summed signals consisting of the RMS signal and the constant volts per hertz voltage signal are connected to the input of derivative amplifier 25 constructed to provide an output signal in accordance with the sum of actual plus time-derivative of the voltage signal and provide an output signal proportional to the sum of the RMS voltage signal and the linear speed control voltage signal. The result is a true volts per hertz control signal of a linear function. The system thus maintains the operation of a constant output voltage above a frequency with a proportionate reduction in the voltage output with the reduction in the frequency. The regulator operates at and above the threshold signals to thus establish a normal voltage regulation. Below the threshold signal, transient signals are ignored with respect to unloading of the alternator. Large signals of a significant time period, however, or high rate of speed change cause the regulator to effect a rapid change in partial unloading of the alternator for the engine to recover and continue the desired normal system operation.

The amplifier unit 26 includes a boundary control circuit 112 connected in feedback circuit to the amplifier 26. Under normal regulating conditions including normal voltage variations, the changes reflected at the input of the operational amplifier 26 result in a very rapid response as a result of the very high gain D.C. of the amplifier, which may be and preferably is 1,000 and above. A sudden and large signal applied to the amplifier creates for an extended time a corresponding large output error and drive signal tending to drive the amplifier to saturation in either direction. For example, a high drive signal to unload the generator rapidly, such as full load switch off, would create an output signal tending to drive the output beyond the desired limit, and thereby result in an undesirable delay in the total recovery of the system. A boundary circuit 112 is connected to maintain the gain and output of the error amplifier operation within certain limits related to the particular voltage gain control. The circuit 112 includes a voltage follower 113 and R-C circuit 114 connected to the amplifier 26 and to the logic voltage supplies to limit the output swing and levels of the amplifier 26.

The underspeed signal of course is operational with any rapid speed change, such as to effect unloading. In the illustrated embodiment of the invention, the output level speed pulse train signal generated at line 60 is coupled to modify the boundary circuit 112 to reflect the level signal received from the underspeed circuit. In the particular illustrated embodiment of the invention, an analog switch 115 is shown connected to the feedback supply circuit 114 of the feedback network in the boundary control circuit 112. The switch 115 operates in synchronism with the underspeed pulse train and provides a pulse width modulation of the signal in the feedback network 112. This modifies the boundary control circuit to limit the output of the error amplifier 26 from providing an undesirably high error signal to the excitation driving circuit. Thus, in the presence of a sudden unloading signal or load change, the boundary control circuit 112 is simultaneously actuated to limit the output of the error amplifier 26 and in particular, the gain so that the alternator voltage will not drop so low as to further prevent desired recovery in an appropriate time cycle or period.

The speed change sensing system of the present invention has been described and particularly applied to a voltage regulator for an A.C. alternator producing an alternating current supply directly related to that of the speed of the alternator and providing power for the regulating and control system. The present invention can readily be applied to other A.C. alternator systems, including systems having means for directly sensing the output of the alternator and generating related control signals, including powering of the alternator voltage regulator and exciter and the like. The invention may also of course be applied to any other rotating device having means for generating an alternating current signal which can be monitored to produce a speed change related signal related to the amplitude of the speed change. The appropriate signal is thereby created for defining the level sensing control and the rate change control interconnected to each other for producing an interrelated control signal.

Although the present invention further discloses the output control signal applied directly to vary the reference voltage input applied to the regulator error amplifier to effect unloading, other controls may of course be used. Additionally, the control signal, rather than or in addition to being applied to a shutdown, may be connected to actuate a suitable indicating alarm or other information device to alert personnel to the speed change condition. Thus, under certain conditions, the user may wish to maintain operation even though there is a significant danger of a serious malfunction in the overall system. The user may be able to provide an alternate course of action to that of total shutdown if appropriate information is generated by the control signal.

Various modes of carrying out the invention are contemplated as being within the scope of the following claims particularly pointing out and distinctly claiming the subject matter which is regarded as the invention.

I claim:

1. A voltage regulator for controlling the output of an alternator, first sensor means for connection to the alternator for sensing the output of the alternator, a control means connected to said sensor means for controlling the alternator in accordance with output of the alternator, a frequency sensing means generating an underspeed signal corresponding to the speed of said alternator, a rate sensing means connected to said frequency sensing means and establishing a rate signal related to the rate of the speed change, a level sensing means connected to said frequency sensing means for providing a proportional level output signal, said rate sensing means and said level sensing means effectively being connected to conjointly generate a control signal responsive to a speed change above a selected rate, and a level output above a selected level, and output means connected to receive said control signal and establish an output signal in response to receipt of said control signal.

2. The regulator of claim 1, wherein said alternator has an input means adapted to be coupled to and driven from an engine and forming a load on the engine related to the electrical load connected to the alternator and, means connected to said output means and operable to rapidly reduce the loading of said alternator and thereby said engine.

3. The regulator of claim 2 including means to limit the degree of said unloading.

4. The regulator of claim 2 including means to limit the rate of said unloading.

5. The regulator of claim 2 wherein said level sensing means reduces the alternator load proportional to the amount of said speed change and for a period proportional to the amount and speed of the speed change.

6. The regulator of claim 1, wherein said rate sensing means and said level sensing means include offset means to prevent response to small transient conditions.

7. The regulator of claim 1, wherein said alternator includes a field winding, a permanent magnet generator and an exciter are connected to said field winding to control the excitation and maintain a regulated output voltage, and wherein said frequency sensing means being connected to the output of the permanent magnet generator for detecting the speed and frequency of the alternator, and said output means being connected to control the excitation current to the exciter and thereby the excitation of said alternator.

8. The regulator of claim 1, wherein said output means includes an error amplifier having a control input and a reference input, and said level sensing means includes a level sensing amplifier having an output connected to adjust the reference level of said error amplifier to significantly reduce the loading of said alternator, and said rate sensing means being operable to hold said level sensing amplifer off below a selected rate of change of said speed signal.

9. The regulator of claim 1 wherein said frequency sensing means includes means to generate a pulse train of pulses having a frequency proportional to the alternator frequency, a capacitor connected in a charging circuit, a logic switch connected to discharge said capacitor and having an input connected to said pulse train to generate a capacitor voltage inversely proportional to the frequency of said pulse train, a threshold detector such that the output is a train of pulses below a selected frequency with mark to space ratio increasing linearly with decreasing speed, smoothing means connected to said threshold detector to generate a linearly increasing voltage with decreasing speed, a derivative means connecting said smoothing means to said rate sensing means, and means connecting said level sensing means to said smoothing means.

10. The regulator of claim 1, wherein said first sensor means including a voltage sensor means having an output means generating a linearly changing voltage signal proportional to the root means square voltage, said output signal of said level sensing means being a linearly changing underspeed voltage, summing means connected to sum said root means square voltage to genrate a volts per hertz signal, and excitation control means connected to said summing means to control said alternator.

11. The regulator of claim 10, wherein said excitation control means includes a high gain amplifier connected to establish an amplified error control signal proportional to the difference of said summed root mean square and volts per hertz signal, and a reference boundary circuit means connected to limit the output of said error amplifier, and said frequency sensing means connected to adjust said boundary circuit in accordance with said output signal.

12. A voltage regulator for an alternator having a field winding and for controlling the excitation of the alternator to maintain a regulated output voltage, comprising voltage sensor means for connection to the alternator for sensing the output voltage of the alternator, means square circuit means for generating a mean square signal corresponding to the absolute square of said alternator output voltage, a square root circuit connected to said means square circuit means and generating an output voltage signal linearly proportional to the root means square of said alternator output voltage, means to control the excitation of the alternator to maintain a selected root means square voltage output, a speed circuit connected to the output of said alternator and producing a linear speed voltage signal with speed variations, and means to combine said linear output voltage and said linear speed voltage to produce a linear RMS volts per hertz signal.

13. The regulator of claim 12, wherein said speed circuit includes means developing a pulse train corresponding to the double frequency of the speed, a capacitor, a capacitor discharging circuit opened and closed in synchronism with the pulse train and generating via a threshold detector an underspeed voltage signal with mark to space ratio corresponding to the amount of speed drop below a selected frequency, a smoothing filter for said circuit to establish a level signal, a level sensing means connected to said filter, a first derivative speed rate circuit connected to said filter to generate a signal related to the rate of the speed and said underspeed voltage signal and connected to said underspeed signal for providing an output only with the said underspeed signal is above a selected level, said derivative speed rate circuit being connected to hold said level sensing means effectively off and responsive to a speed change above a selected rate to release said level sensing means for transmission of the level signal, and means responsive to said level signal to vary the operation of said excitation circuit to reduce the excitation of said alternator and driving engine.

14. The regulator of claim 13, wherein said rate sensing means includes operational rate sensing amplifier, said derivative speed rate circuit connecting the output of said filter to the positive input of said rate sensing amplifier and establishing an output in response to receipt of a signal of a predetermined change in speed, said level detecting means including a difference amplifier having an input connected to the underspeed signal and to a reference signal, the output of said difference amplifier being connected to said control means, said rate sensing means including means connected to said level sensing difference amplifier and operable to hold said amplifier off in the absence of the receipt of underspeed signal of a minimum rate of change.

15. The regulator of claim 13, having a permanent magnet generator providing power to said regulator, a ladder filter connected to the output of the permanent magnet generator establishing a frequency signal corresponding to the frequency of the permanent magnet generator, a Schmitt-trigger connected to the output of the ladder filter establishes a square wave signal of a frequency corresponding to the frequency signal, a phase-locked loop circuit connected to said Schmitt-trigger and locking of the square wave signal to the fundamental frequency of the permanent magnet generator output, a frequency doubler including an edge detector connected to the output of the phase-locked loop circuit and generating a train of pulses essentially coincident with the zero crossover location of said square wave signal, a solid state switch connected to said pulse train and opened and closed in synchronism therewith, a speed control capacitor charging circuit connected to said capacitor, said switch being connected in parallel with said capacitor whereby the charge on said capacitor is directly related to the frequency of said pulse train, a threshold detector having a first input connected to a reference voltage and second input connected to said control capacitor and detecting an underspeed threshold voltage and establishing a corresponding output pulse train of pulses having a width related to the speed voltage and means connected to the output of said threshold detector and to said rate sensing circuit and to said level sensing means.

16. The regulator of claim 15, including offset means to establish response of said rate sensing means and of said level sensing means only at a selected frequency slightly below said threshold frequency.

17. The regulator of claim 12, wherein said rate sensing means includes an operational control amplifier, a derivative circuit means connecting the output of said control amplifier to the positive input of said rate sensing amplifier and establishing an output in response to receipt of a signal of a predetermined speed, said level detecting means including a difference amplifier having an input connected to the underspeed signal and to a reference signal, the output of said difference amplifier being connected to said control means, said rate sensing means including means connected to said level sensing difference amplifier and operable to hold said amplifier off in the absence of the receipt of underspeed signal of a minimum rate of change.

18. A voltage regulator for regulating an alternator having an output means to establish a constant RMS voltage, comprising means square circuit means connected to the alternator output means and establishing a pulse train having an amplitude and a time ratio proportional to the alternator voltage and having a filter means to filter said pulse train and establish a means square voltage signal linearly proportional to the means square of the alternator voltage, a square root circuit connected to said mean square circuit means and establishing a square root signal proportional to the square root of said means square voltage signal, a control means connected to said square root circuit to control the alternator and wherein said square root circuit includes an operational amplifier having a positive input connected to receive said mean square voltage signal, a negative feedback circuit connected between the output of the operational amplifier and the negative input of said operational amplifier, a pulse width-height multiplier connected to the output of said operational amplifier and to said feedback circuit and generating a feedback signal at said negative input equal to the square of the output voltage applied to the negative input equal and said operational amplifier forces, said squared voltage to equal said means square voltage applied to the positive input, and whereby the output voltage is thereby equal to the square root of the means square voltage signal at the operational amplifier.

19. The voltage regulator of claim 18, wherein said multiplier includes a pulse modulator connected to the output of said input amplifier, a switch means connecting said negative feedback network to reference to short the feedback circuit to reference, the output of said pulse modulator being connected to said switch means and actuating said switch means to switch the feedback signal to zero during the time that the output of the amplifier is high and thereby generating a voltage that has a height and pulse width proportional to the output voltage.

20. A voltage regulator for regulating an alternator having an output means to establish a constant RMS voltage, comprising means square circuit means connected to the alternator output means and establishing a pulse train having an amplitude and a time ratio proportional to the alternator voltage and having a filter means to filter said pulse train and establish a means square voltage signal linearly proportional to the means square of the alternator voltage, a square root circuit connected to said means square circuit means and establishing a square root signal proportional to the square root of said means square voltage signal, a control means connected to said square root circuit to control the alternator wherein said control means includes an error amplifier having a negative input connected to receive a voltage control signal for regulating and maintaining a constant output voltage, said amplifier having a positive input terminal connected to a reference voltage, a speed sensing means generating a linear speed related signal and connected to said reference input and operable to reduce the reference signal and thereby reduce the drive signal and unload said alternator in the presence of a speed dip signal, combining means combining the output of said speed sensing means with the output of said square root circuit to produce a linear volts per hertz signal, a differential amplifier connecting said combining means to said negative input of said error amplifier.

21. The regulator of claim 20, wherein said erro amplifier is a high gain amplifier, an output boundary circuit connected to said error amplifier to limit the output of said amplifier and thereby eliminate excessively large output signals for controlling said alternator.

22. The regulator of claim 21, wherein said speed sensing means is connected to adjust the boundary circuit.

23. A speed responsive control for rotating equipment having an alternating current output winding means for generating an alternating current signal proportional to speed, comprising input sensing means adapted to be connected to said alternating current output winding means, mean square circuit means coupled to said input sensing means and generating a mean square signal corresponding to the mean square of the alternating current in said output winding means, a square root circuit coupled to said mean square circuit means and producing a square root signal corresponding to the square of said means square signal, and an error amplifier having input means connected to said square root circuit and generating and producing a control signal in accordance with the square root signal, said square root circuit includes an operational amplifier having a non-inverting input connected to said means square circuit, a negative feedback network connecting the output of said operational amplifier to an inverting input of said operational amplifier, said negative feedback network including a pulse width modulator constructed and operated as a pulse-width-heighth multiplier to generate to produce the square of the output of said operational amplifier and applying said square signal to said inverting input whereby said operational amplifier forces the output to equal the square root of said mean square signal.

24. The voltage regulator of claim 23, wherein said negative feedback network includes a plurality of resistors and a capacitor connected in circuit between the output of said operational amplifier and said inverting input of said operational amplifier, said pulse-width-heighth multiplier including a pulse width modulator having an input connected to the output of said operational amplifier and a pulse output connected to periodically vary the connection of said feedback network to control voltage to produce square output of said operational output voltage of said operational amplifier.

* * * * *

UNITED STATES PATENT AND TRADEMARK OFFICE
CERTIFICATE OF CORRECTION

PATENT NO. : 4,777,425
DATED : October 11, 1988
INVENTOR(S) : ALISTAIR A. MACFARLANE It is certified that error appears in the above-identified patent and that said Letters Patent is hereby corrected as shown below:

Face of Patent, delete incorrect Serial Number 697,058 and substitute therefore correct Serial Number ---897,058---; Col. 14, line 1, delete "genrate" and substitute therefor ---generate---; Col. 14, line 47, after "signal" delete "is"; Col. 14, line 54, after "alternator" insert ---and thereby unload said alternator---; Col. 14, line 56, after "includes" insert ---an---; Col. 16, line 50, delete "erro" and substitute therefor ---error---; Col. 17, line 11, delete "pulse-width-heighth" and substitute therefor ---pulse-width-height---; Col. 18, line 8, delete "pulse-width-heighth" and substitute therefor ---pulse-width-height---.

Signed and Sealed this

Twenty-fourth Day of October, 1989

Attest:

DONALD J. QUIGG

*Attesting Officer*       *Commissioner of Patents and Trademarks*